United States Patent
Flanagan

(10) Patent No.: US 10,482,107 B2
(45) Date of Patent: Nov. 19, 2019

(54) APPARATUS, SYSTEM AND METHOD FOR THE EFFICIENT STORAGE AND RETRIEVAL OF 3-DIMENSIONALLY ORGANIZED DATA IN CLOUD-BASED COMPUTING ARCHITECTURES

(71) Applicant: Ubiterra Corporation, Denver, CO (US)

(72) Inventor: Peter W. Flanagan, Denver, CO (US)

(73) Assignee: Ubiterra Corporation, Denver, CO (US)

( * ) Notice: Subject to any disclaimer, the term of this patent is extended or adjusted under 35 U.S.C. 154(b) by 7 days.

(21) Appl. No.: 14/936,440

(22) Filed: Nov. 9, 2015

(65) Prior Publication Data

US 2016/0063091 A1    Mar. 3, 2016

Related U.S. Application Data

(63) Continuation of application No. 13/654,316, filed on Oct. 17, 2012, now Pat. No. 9,182,913.

(60) Provisional application No. 61/548,593, filed on Oct. 18, 2011, provisional application No. 61/548,580, filed on Oct. 18, 2011.

(51) Int. Cl.
| | |
|---|---|
| *G06F 16/00* | (2019.01) |
| *G06F 16/28* | (2019.01) |
| *G01V 1/34* | (2006.01) |
| *G01V 1/30* | (2006.01) |
| *G06F 16/35* | (2019.01) |

(Continued)

(52) U.S. Cl.
CPC ............ *G06F 16/285* (2019.01); *G01V 1/302* (2013.01); *G01V 1/345* (2013.01); *G06F 3/064* (2013.01); *G06F 3/067* (2013.01); *G06F 3/0611* (2013.01); *G06F 16/283* (2019.01); *G06F 16/355* (2019.01); *H04L 67/2842* (2013.01)

(58) Field of Classification Search
CPC ...... G01V 1/302; G01V 1/3452; G01V 1/345; G06F 17/30592; G06F 3/067; G06F 3/064; G06F 17/3071; G06F 17/30598; G06F 16/283; G06F 16/285; H04L 67/2842
See application file for complete search history.

(56) References Cited

U.S. PATENT DOCUMENTS 5,724,241 A * 3/1998 Wood .................. G01V 1/20
702/14
5,842,207 A * 11/1998 Fujiwara ................ G06F 7/24

(Continued)

*Primary Examiner* — Leslie Wong
(74) *Attorney, Agent, or Firm* — Polsinelli PC

(57) ABSTRACT

A cloud based storage system and methods for uploading and accessing 3-D data partitioned across distributed storage nodes of the system. The data cube is processed to identify discrete partitions thereof, which partitions may be organized according to the x (e.g., inline), y (e.g., crossline) and/or z (e.g., time) aspects of the cube. The partitions are stored in unique storage nodes associated with unique keys. Sub-keys may also be used as indexes to specific data values or collections of values (e.g., traces) within a partition. Upon receiving a request, the proper partitions and values within the partitions are accessed, and the response may be passed to a renderer that converts the values into an image displayable at a client device. The request may also facilitate data or image access at a local cache, a remote cache, or the storage partitions using location, data, retrieval, and/or rendering parameters.

19 Claims, 11 Drawing Sheets

(51) Int. Cl.
*G06F 3/06* (2006.01)
*H04L 29/08* (2006.01)

(56) References Cited

U.S. PATENT DOCUMENTS

| | | | | |
|---|---|---|---|---|
| 5,995,904 | A * | 11/1999 | Willen | G06F 17/10 |
| | | | | 702/14 |
| 6,314,452 | B1 * | 11/2001 | Dekel | H04N 19/647 |
| | | | | 375/E7.045 |
| 6,542,967 | B1 * | 4/2003 | Major | G06F 12/127 |
| | | | | 707/E17.12 |
| 6,735,527 | B1 * | 5/2004 | Levin | G01V 1/36 |
| | | | | 702/14 |
| 7,283,611 | B1 * | 10/2007 | Luan | A61N 5/103 |
| | | | | 378/51 |
| 8,150,914 | B1 * | 4/2012 | Taneja | H04L 67/06 |
| | | | | 709/203 |
| 8,539,155 | B1 * | 9/2013 | Miao | G06F 12/10 |
| | | | | 711/120 |
| 8,805,968 | B2 * | 8/2014 | Taylor | G06F 17/30132 |
| | | | | 709/219 |
| 9,182,913 | B2 * | 11/2015 | Flanagan | G06F 3/0611 |
| 2002/0125312 | A1 | 9/2002 | Ogilvie | |
| 2003/0055832 | A1 * | 3/2003 | Roccaforte | G06F 17/30592 |
| 2003/0167126 | A1 | 9/2003 | Horne | |
| 2005/0203930 | A1 * | 9/2005 | Bukowski | G06F 17/30241 |
| 2006/0170682 | A1 * | 8/2006 | Van Liere | G06T 1/60 |
| | | | | 345/427 |
| 2007/0206008 | A1 * | 9/2007 | Kaufman | G06T 15/06 |
| | | | | 345/424 |
| 2007/0225917 | A1 * | 9/2007 | Guatteri | G01V 1/008 |
| | | | | 702/15 |
| 2008/0015784 | A1 * | 1/2008 | Dorn | G01V 1/30 |
| | | | | 702/16 |
| 2008/0270319 | A1 | 10/2008 | Torabi et al. | |
| 2009/0003132 | A1 * | 1/2009 | Vassallo | G01V 1/3808 |
| | | | | 367/75 |
| 2009/0089078 | A1 * | 4/2009 | Bursey | G06Q 10/101 |
| | | | | 705/300 |
| 2009/0122061 | A1 * | 5/2009 | Hammon, III | G01V 1/302 |
| | | | | 345/424 |
| 2009/0132170 | A1 * | 5/2009 | Krueger | G01V 1/34 |
| | | | | 702/16 |
| 2009/0282369 | A1 * | 11/2009 | Jones | G06F 17/30554 |
| | | | | 715/848 |
| 2009/0313436 | A1 * | 12/2009 | Krishnaprasad | G06F 12/0802 |
| | | | | 711/129 |
| 2009/0326895 | A1 * | 12/2009 | Beasley | G01V 1/36 |
| | | | | 703/10 |
| 2010/0149917 | A1 * | 6/2010 | Imhof | G01V 1/302 |
| | | | | 367/53 |
| 2010/0172207 | A1 * | 7/2010 | Gulbransen | G01V 1/201 |
| | | | | 367/19 |
| 2010/0223276 | A1 * | 9/2010 | Al-Shameri | G06F 17/30333 |
| | | | | 707/769 |
| 2010/0269028 | A1 | 10/2010 | Othmer | |
| 2010/0312534 | A1 * | 12/2010 | Xu | G01V 1/50 |
| | | | | 703/2 |
| 2010/0332451 | A1 | 12/2010 | Vosshall et al. | |
| 2011/0055290 | A1 | 3/2011 | Li et al. | |
| 2011/0261049 | A1 * | 10/2011 | Cardno | G06Q 10/10 |
| | | | | 345/419 |
| 2012/0089579 | A1 * | 4/2012 | Ranade | G06F 17/30153 |
| | | | | 707/693 |
| 2012/0233668 | A1 * | 9/2012 | Leafe | G06F 9/44526 |
| | | | | 726/4 |
| 2012/0278586 | A1 * | 11/2012 | Caufield | G06F 9/505 |
| | | | | 711/173 |
| 2013/0036272 | A1 * | 2/2013 | Nelson | H04L 67/1097 |
| | | | | 711/147 |
| 2013/0138646 | A1 * | 5/2013 | Sirer | G06F 17/30545 |
| | | | | 707/736 |
| 2013/0211795 | A1 * | 8/2013 | Vanker | G06F 17/5004 |
| | | | | 703/1 |
| 2013/0305039 | A1 * | 11/2013 | Gauda | G06F 21/6218 |
| | | | | 713/153 |
| 2016/0239749 | A1 * | 8/2016 | Peredriy | G06N 5/048 |

* cited by examiner

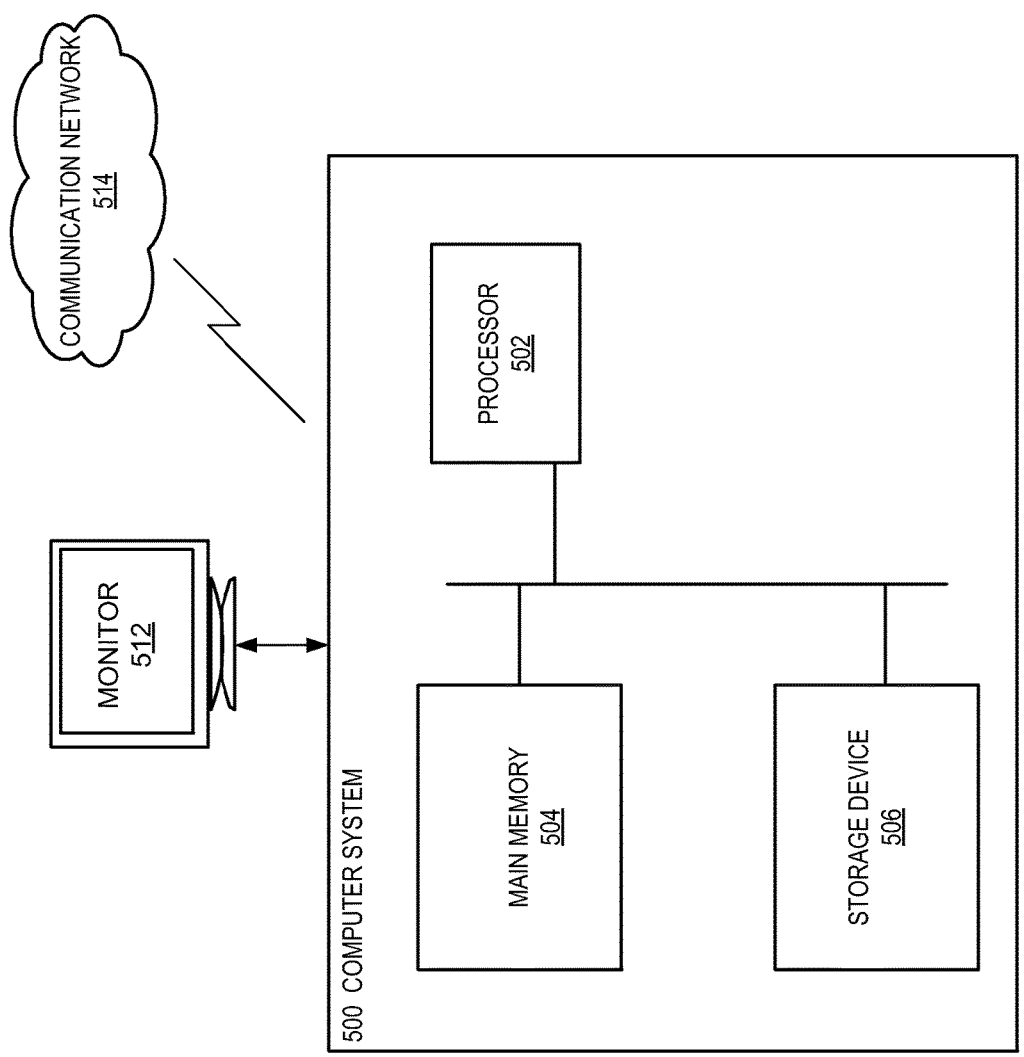

APPARATUS, SYSTEM AND METHOD FOR THE EFFICIENT STORAGE AND RETRIEVAL OF 3-DIMENSIONALLY ORGANIZED DATA IN CLOUD-BASED COMPUTING ARCHITECTURES

CROSS REFERENCE TO RELATED APPLICATIONS

The present application is a continuation of, and claims priority to U.S. application Ser. No. 13/654,316 (the "'316 Application") titled "APPARATUS, SYSTEM AND METHOD FOR THE EFFICIENT STORAGE AND RETRIEVAL OF 3-DIMENSIONALLY ORGANIZED DATA IN CLOUD-BASED COMPUTING ARCHITECTURES" filed Oct. 17, 2012, which claims priority under 35 U.S.C. § 119(e) to provisional application No. 61/548,593 titled "METHOD FOR EFFICIENT STORAGE AND RETRIEVAL OF 3 DIMENSIONALLY ORGANIZED SAMPLE DATA IN CLOUD-BASED COMPUTING ARCHITECTURES" filed on Oct. 18, 2011, the disclosure of which is hereby incorporated by reference herein, which also claims priority under 35 U.S.C. § 119(e) to provisional application No. 61/548,580 titled "METHOD FOR CACHING OF CROSS-SECTIONS AND SLICES OF 3 DIMENSIONALLY ORGANIZED SAMPLES DATA IN CLOUD-BASED COMPUTING ARCHITECTURES" filed on Oct. 18, 2011, the disclosure of which is hereby incorporated by reference herein.

BACKGROUND

A number of scientific methods involve collecting sample data in a 3-dimensionally organized form. For example, seismic exploration data, collected in efforts to identify natural gas, oil, water and other underground resources, involves data in the x and y horizontal planes as well as z plane data typically associated with time. To collect the raw data, a seismic survey is conduced that involves seismic waves (essentially sound waves) that are created on the earth's surface. The waves may be initiated in any number of ways including through the use of dynamite or seismic vibrators. As the waves propagate downward, portions of the waves reflect back to the surface when the waves interact with an underground object, layers, or any number of other possible underground features. The reflected wave data is collected over a wide geographic area. The raw collected data is stored and converted, such as through a process sometimes referred to as stacking, into a form, such as a seismic stack, that can show various underground objects and features in a human readable way through various types of software and user interfaces. Geologists, geophysicists, and others, using the processed data and tools can then interpret the data and to identify those features associated with the presence of natural gas, shale, oil, water, and other things.

In the case of a seismic stack, a person will often view various slices or cross-sections of the processed stack data taken along the x-axis (inline), the y-axis (crossline), the z-axis (slice or time direction) or some combination thereof. Since the stack represents a 3-D image of a large underground cube, by viewing various slices through the data, a person can see feature changes, identify underground shapes and contours, and numerous other characteristics of the data. These data sets can be massive, on the order of 10 s or more gigabytes of data in some instances. Visualizing and working with the data requires large amounts of fast data storage and fast processors.

Accordingly and conventionally, work station class computers are often used and the sequence of data that is desired to be viewed is read from disc into local memory of the workstation. The data is stored on disc in a logical way, typically stored in order based on the x-axis which makes reading data along the x-axis from disc into local memory quick and efficient as a read head within the disc simply moves from block to block in the way it was stored on disc, which may only take a fraction of a second. However, when the user wants to view slices along the y-axis, z-axis or some other more sophisticated combination of axes, a read head of the disc must seek to different blocks and sectors of the disc making the operation much more time consuming. While disc seeks in modern systems are very fast, because of the magnitude of data that may need to be read and the number of possible seeks required, the task can still be time consuming—e.g., 5 seconds or more.

To solve some of these concerns, improvements have involved simply moving all of the stack data into local memory of the workstation, organizing the data into bricks or discrete chunks of data and reading only the relevant bricks into memory, different schemes of organizing data on disc for more efficient retrieval, and others. Regardless of any conventional solutions, the state of the art presents numerous challenges. First, the data stack is proprietary and very valuable so it must be handled with care and duplicated with appropriate care. Second, while working with the data stored locally is possible, it does not facilitate collaboration on the data when the collaborators are not in the same facility. Moreover, moving the data among locations is difficult given its size and the proprietary nature of the data.

It is with these issues in mind, among others, that various aspects of the present disclosure were developed.

SUMMARY

Aspects of the present disclosure involve a method of efficiently managing a data set in a cloud storage array. The method includes the operations of partitioning a three dimensional data set into a plurality of related data sets (groups of traces). The method further involves storing each of the plurality of related data sets into a plurality of respective storage nodes within a storage cloud.

Each data set of the plurality of related data sets may have a first axis identifier, a second axis identifier and a plurality of values along a third axis. The plurality of related data sets may include a plurality of groups of data sets with each group comprising a range of x-axis identifiers and a range of y-axis identifiers. In such cases, the operation of storing may include storing each group of data sets into the plurality of respective storage nodes.

In some instances, each data set may comprise a set of seismic traces with the x-axis identifier comprising an inline value of the seismic trace data, the y-axis identifier comprising a crossline value of the seismic trace data, and the plurality of values along the third axis comprising reflection data at time intervals or at depth intervals.

Aspects of the present disclosure also involve a method of obtaining data from cloud storage. The method involves generating a request that determines whether a data image is available in a local cache, determines whether data values are available in a remote cache to render the data image when the data image is not available in the local cache, and obtains the data values for the data image from a plurality of remote storage nodes when the data values are not available in the remote cache. The request may be include a uniform resource locator comprising a network location, a retrieval parameter and a rendering parameter. The data values may include a plurality of seismic traces data values. In such instances, the network location is a network address for a server managing a retrieval of the data trace data values from the plurality of remote storage nodes, the retrieval parameter includes at least one trace identifier, and the rendering parameter includes data processing information applied by a rendering application run against the data values.

Additionally, aspects of the present disclosure involve a computing system with at least one server computing device configured to execute a plurality of executable instructions. The executable instructions perform the operations of partitioning a seismic data set into a plurality of data partitions where each of the plurality of data partitions comprises a group of related seismic trace data values. The operations further include generating a plurality of unique storage keys for the plurality of data partitions such that each of the plurality of unique storage keys is associated with a respective plurality of unique storage partitions.

BRIEF DESCRIPTION OF THE DRAWINGS

Aspects of the present disclosure may be better understood and its numerous objects, features, and advantages made apparent to those skilled in the art by referencing the accompanying drawings. It should be understood that these drawings depict only typical embodiments of the present disclosure and, therefore, are not to be considered limiting in scope.

FIG. 11 is a diagram depicting a computer architecture for one possible general purpose computing device for use with various aspects of the present disclosure.

DETAILED DESCRIPTION

Aspects of the present disclosure involve apparatus, systems and methods for the efficient storage and retrieval of 3-dimensionally (3-D) organized sample data in cloud-based computing architectures. More particularly, aspects of the present disclosure involve partitioning 3-dimensionally organized data and storing the partitions in distinct storage partitions within a cloud storage arrangement. The storage partitions may be associated with independent and dedicated processing threads and controls such that the data partitions may be written into storage and read from storage partially or completely in parallel. The data may be partitioned based on different axes of the 3-dimensional data set, and stored in the cloud partitions based on the partitioning of the data. The data may also be selectively read from the various cloud partitions so that different aspects of the data may be read without reading the entirety of the 3-D data stored. Reading, like writing the data, may also occur in parallel.

The various apparatus, systems and methods discussed herein provide for efficient storage and retrieval of massive 3-dimensionally organized data to and from the cloud, access and sharing of the data across the world, greater data security, and numerous other advantages and efficiencies over conventional systems. The example implementation discussed herein reference the 3-D data as a seismic stack. However, the present disclosure is applicable to any number of other types of 3-D data such as medical data (e.g., magnetic resonance imaging (MRI)), oceanic data, weather data, etc.

Figure 1:
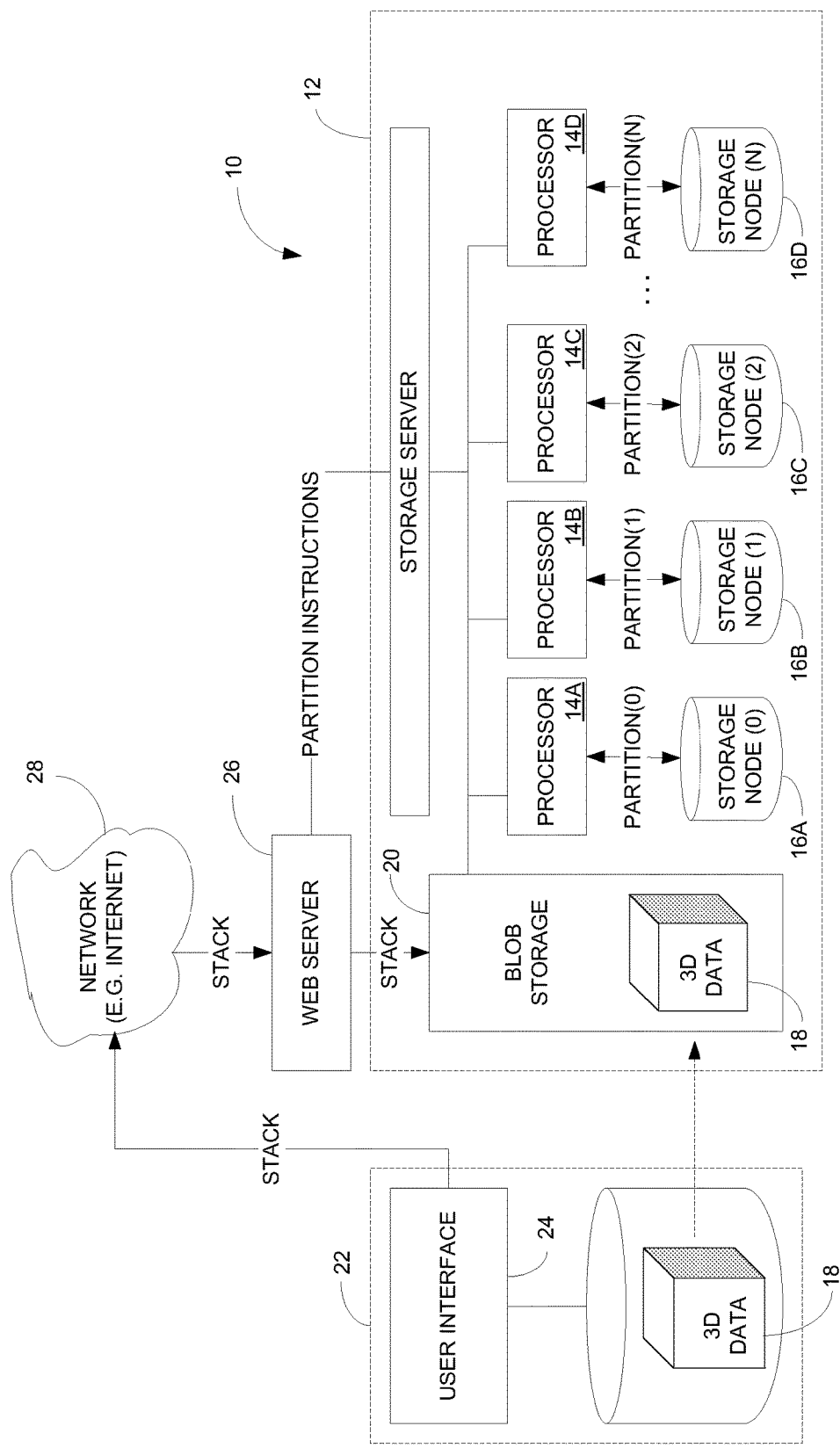
FIG. 1 is a system diagram depicting a network, including a cloud storage network, and a remote device connected to the network, the system configured to partition and store 3-D data into distributed storage within the cloud storage network.

Referring now to FIG. 1, a cloud computing environment 10, and particularly a cloud computing environment with cloud-based storage 12, involves numerous distinct processors and/or processor threads 14, storage nodes 16 and input/output (I/O) for the storage nodes. A given storage node may be physical and/or virtual meaning that a storage node may comprise various memory and storage elements including L1 cache, L2 Cache, and hard disc storage among other things. A particular storage solution may also back-up or replicate data and may also archive data in tape-based archives or otherwise. A given storage node may be virtualized such that a set of memory and storage forms one or more storage nodes. Each processor may be capable of executing one or more distinct processing threads. Thus, the system set out herein contemplates a range of possible cloud storage solutions ranging from a dedicated processor, I/O and storage, to a processor executing various threads for reading and writing data into and out of a virtualized storage node. As used herein, the term "thread" contemplates a processor that is able to execute computing operations. A processor is able to execute at least one thread, and some processors are capable of executing many threads. Such processors may be referred to or otherwise include multi-threaded processors, parallel processors, multi-core processors (where each core is able to execute one or more threads), and the like.

Figure 3:
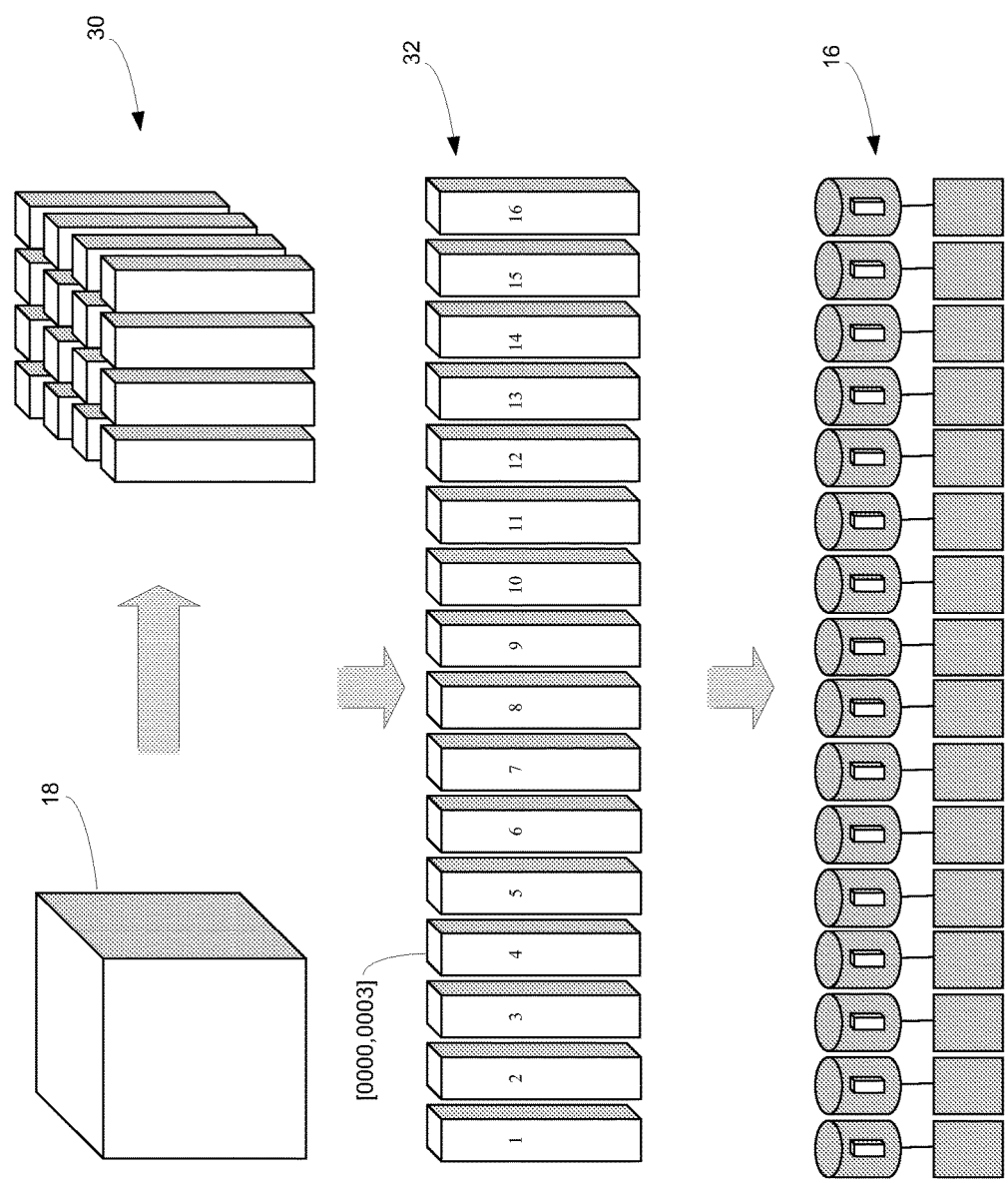
FIG. 3 is a logical flow between a 3-D cube through partitioning and the storage of the partitions in distinct storage nodes.

Referring to FIG. 3 and others, in one possible implementation of this disclosure, a 3-D data set 18 is partitioned or otherwise divided into discrete partitions 30. When referring to a seismic stack, the data may be divided into bricks or columns. Each discrete column is then stored in a discrete storage node in the cloud. A processor thread may then act on the discrete chunk acting in parallel with other treads acting on other chunks. Thus, data may be loaded and stored in the cloud in parallel, and data may be read from the cloud in parallel. Stated differently, each seismic partition is stored in its own storage node. When accessing the data, threads may be launched on a per node basis to access the particular data within a given node to complete the I/O request.

Figure 2:
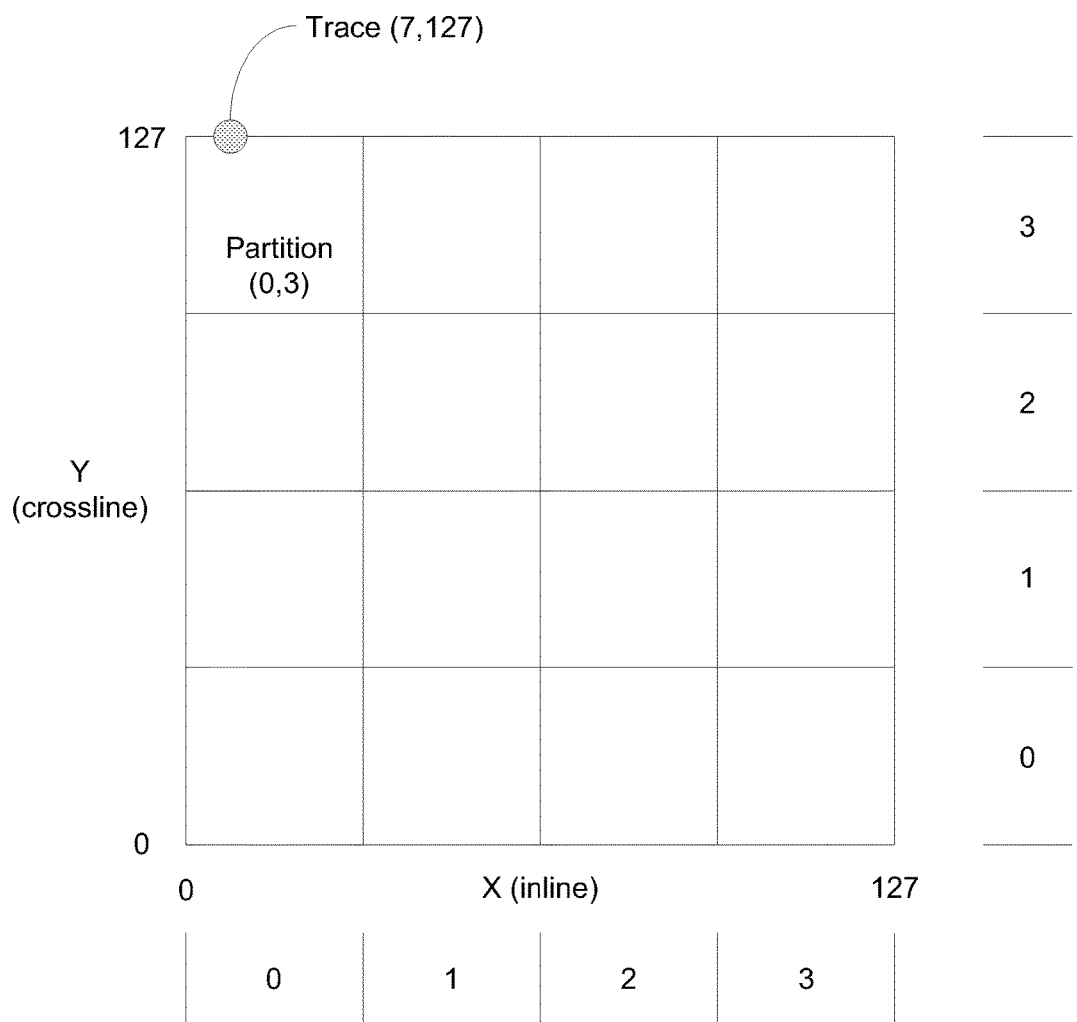
FIG. 2 is a diagram depicting one example of how a 3-D cube, in this example a seismic stack of 128×128 traces, of some depth, is partitioned.

In one particular case, the storage node involves a non-relational data base with underlying disc for physically storing the data. Further, in one particular example, the data cube (stack), which may comprise some number of traces, is partitioned into a 32 trace×32-trace columns or partitions. The depth of the column along the time or z-axis depends on the depth of the stack from which the partitions are created. Thus, for example, if the stack has 128 traces along the x axis (inline), then the stack is divided into 4 32-trace columns along the x-axis. If the same stack is 128 traces along the y-axis (crossline), then the stack is divided into a 16 total 32-trace columns (4 columns×4 columns), as shown in FIG. 2. While a 32×32×Z column size is discussed, other column (partition) sizes are contemplated and within the scope of the present disclosure.

Any particular trace within the stack has an inline (i) location and a crossline (c) location. Through an integer division and modulo operation, any trace within the set of columns may be identified, even when separated and stored in different storage nodes. The following operations provide an index into the proper partition, and into the proper trace within a partition:
  a. Inter-partition index (i/32, c/32): index to a column having the particular trace
  b. Intra-partition index (i %32, c %32): index to a particular trace within a given column So, for example, referring again to FIG. 2, to locate a trace specific at inline location 7 and crossline location 127 (of the stack), the following occurs:
inter-partition index ((7/32), 127/32))=(0, 3): Thus, among the 16 partitions, the partition having trace (7, 127) is at partition (0, 3) (represented as 0-3 when concatenated as partition key).
intra-partition index (7%32, 127%32)=(7,31): Thus, trace (7,127) is at location (7,31) (represented as sub-partition key (7-31)) within partition (0, 3).

In the example above for the inter-partition index, the integer division operation 7/32=0. Here, the integer value of dividing 7/32 is 0. Similarly, the integer division operation 127/32=3. Here, the integer value of dividing 127/32=3. With respect to the second operation, the modulo operation 7%32=7 and 127%32=31.

The operator of 32 in both cases may be other possible values. Generally speaking, it represents a possible range of inline or crossline values, and is an integer. Other possible operator values are 8, 10, 16, 64, 128, etc., and depends on various factors including the data cube size, storage set up, etc.

Returning to FIG. 1 and also referring to FIG. 3, after the raw seismic data is processed and converted into a stack, it may be uploaded into binary large object ("blob") storage 20 within the cloud storage 12, or some other form of intermediate storage area for the stack data. In one example, the stack data is in the form of a .sgy file, which is file format for transporting large data sets and particularly seismic stack data sets. Here, an intermediate copy of the entire stack is stored in the same form as at a remote device 22. The stack data has trace indexes for the entire stack.

From blob storage, the stack is partitioned into the discrete partitions (or chunks or bricks), and each partition is stored into a storage node 16. The act of partitioning includes creating columns and column indexes as well as indexes to particular traces within each column. The partitions may be encrypted and/or compressed. Storage of the partitions may occur non-serially, meaning that it is not necessary (albeit) possible that one partition be stored first followed by another, and so on. Rather, depending on the architecture of the storage, the partitions may be stored using separate processors and/or threads. In some systems, this may be considered to be occurring in "parallel."

Partitioning, which may also be referred to as "sharding," involves the partitioning of the 3-D stack of contiguous data (traces) into partitions. Each trace of the stack involves a trace header defining the inline and crossline numbers of the trace within the stack. The trace also has measurement values corresponding to seismic measurements taken along the z-axis, which are typically a series of seismic values at time increments such as 2 milliseconds. The inter- and intra-partition indexing schemes defined above are used to initially assign traces to a column. Essentially, each of the inline and crossline values of each trace are used to calculate the column number for which it will be assigned as well as identify the location within the assigned column for later retrieval. So, all of the traces for partition (0,0) will be stored in the first storage node, each of the traces for partition (0,1) will be stored in the second partition, and so on.

Indexing information may be used to generate a key for each of the partitions, which may be then used by the storage partitions (nodes) to store the appropriate data partition. Generally speaking, a distributed storage system involves a flat one-dimensional collection of storage nodes. As conceptually illustrated in FIG. 3, the cube 18 is partitioned into columns 30. Each column, however, involves an x and y location or identifier. The x and y locations of the column are each comprised of a set or range of inline trace values and crossline trace values. Thus, each partition (the x and y ranges, for example) are identified with a distinct key (concatenating the x and y column values (as opposed to distinct x (inline) and y (crossline) trace values) that is also inherently one-dimensional and therefore provides for mapping between the partitions and the storage nodes, which is illustrated by the 1-dimensional partition representation 32.

So, for column (0,3), the partition key involves the following string [0000][0003], which is a concatenation of the inline and cross line identifiers for the partition. The storage than uses the partition key to determine where to store a column and to create a one-to-one correspondence between the columns and storage nodes. The partition key is also used to extract the data later from the storage partition, as discussed below. Generation of the partition keys, in this specific example, involves concatenating or otherwise combining the x-column (partition) index with the y-column (partition index) index, so that (0, 3) becomes 0-3 (represented by key 4 of FIG. 3). So the traces in the partition have been flattened into a simple enumeration (list). They are now stored sequentially within single storage node as the data for that partition.

Figure 4:
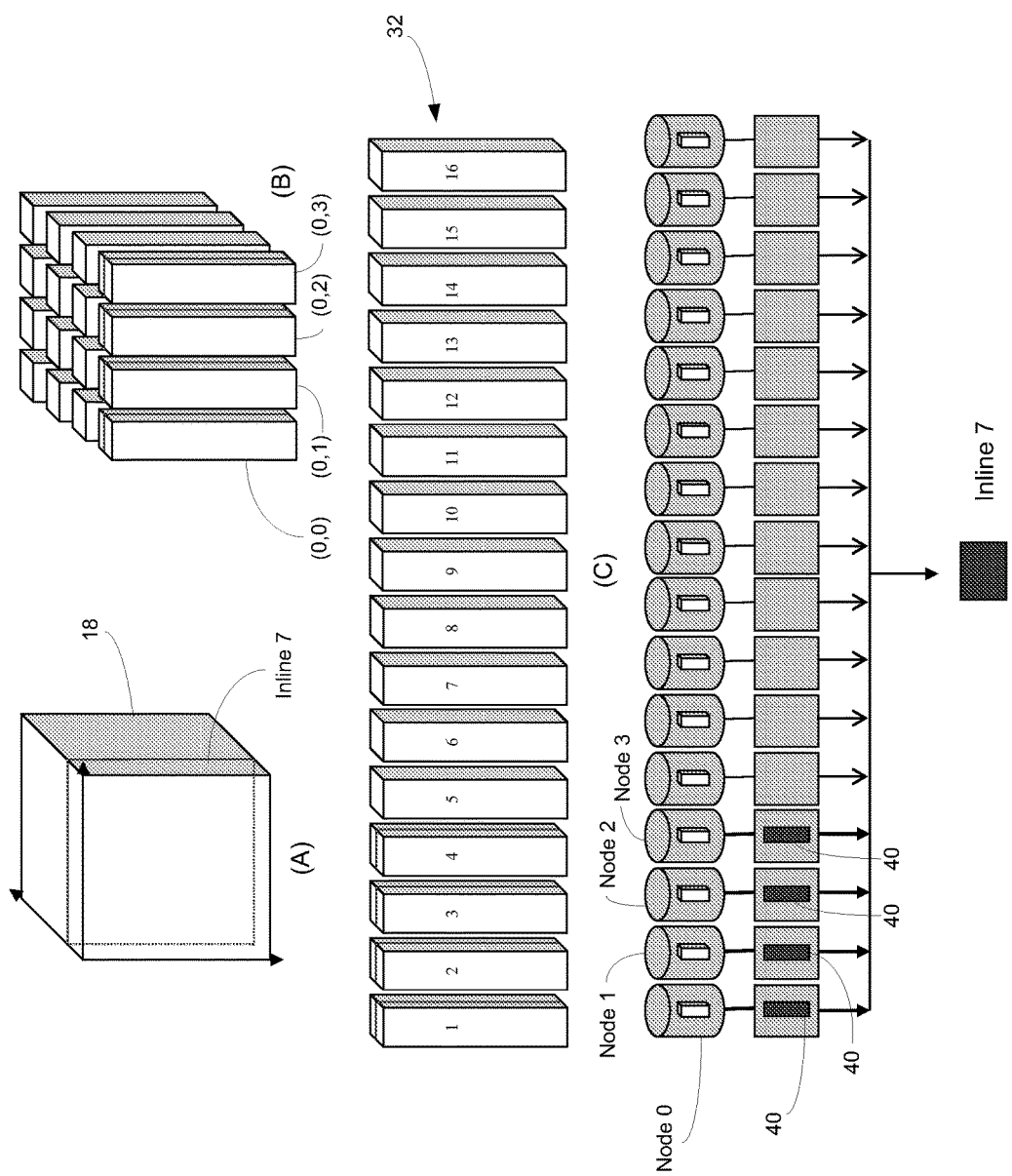
FIG. 4 is a logical flow of requesting an inline trace from the distributed storage nodes holding the partitioned data.

FIG. 4 illustrates an example of extracting an inline slice from a stack. To begin, a user at a remote device 22, initiates a request from a user interface 24. The request is transmitted to a web server 26, by way of a network 28, such as the internet. The web server generates one or more keys for accessing the storage nodes 16. The keys may be passed to or otherwise processed by a storage server 20 or may be passed to or otherwise processed by the processors 14. In one example, the storage server 30 launches the appropriate threads 14 to access the appropriate traces from the partition in the nodes 16.

Since the stack has been partitioned and distributed across several storage nodes, the system identifies the columns having portions of the slice, and then extracts the relevant traces from the appropriate subset of all nodes holding the entirety of the stack partitions. FIG. 4(A) illustrates a selection of an inline slice to be taken along inline 7. So, at a remote GUI 24, a user has issued a command to view the trace data along inline 7. FIG. 4B illustrates the particular columns (0,0), (0,1), (0,2) and (0,3) that would include the trace data for inline 7. FIG. 4C shows 16 columns, including columns (0,0)=1, (0,1)=2, (0,2)=3 and (0,3)=4 translated from a 2-D array (FIG. 4B) into a 1-D array (FIG. 4C). To extract the trace data 40, separate threads are dispatched in storage nodes 0-3 to read and decrypt the appropriate trace data, which in this example is found in columns (0,0), (0,1), (0,2) and (0,3). From these nodes, the inter-partition index keys are used to pull only the trace data for inline 7 of the original stack.

Figure 5:
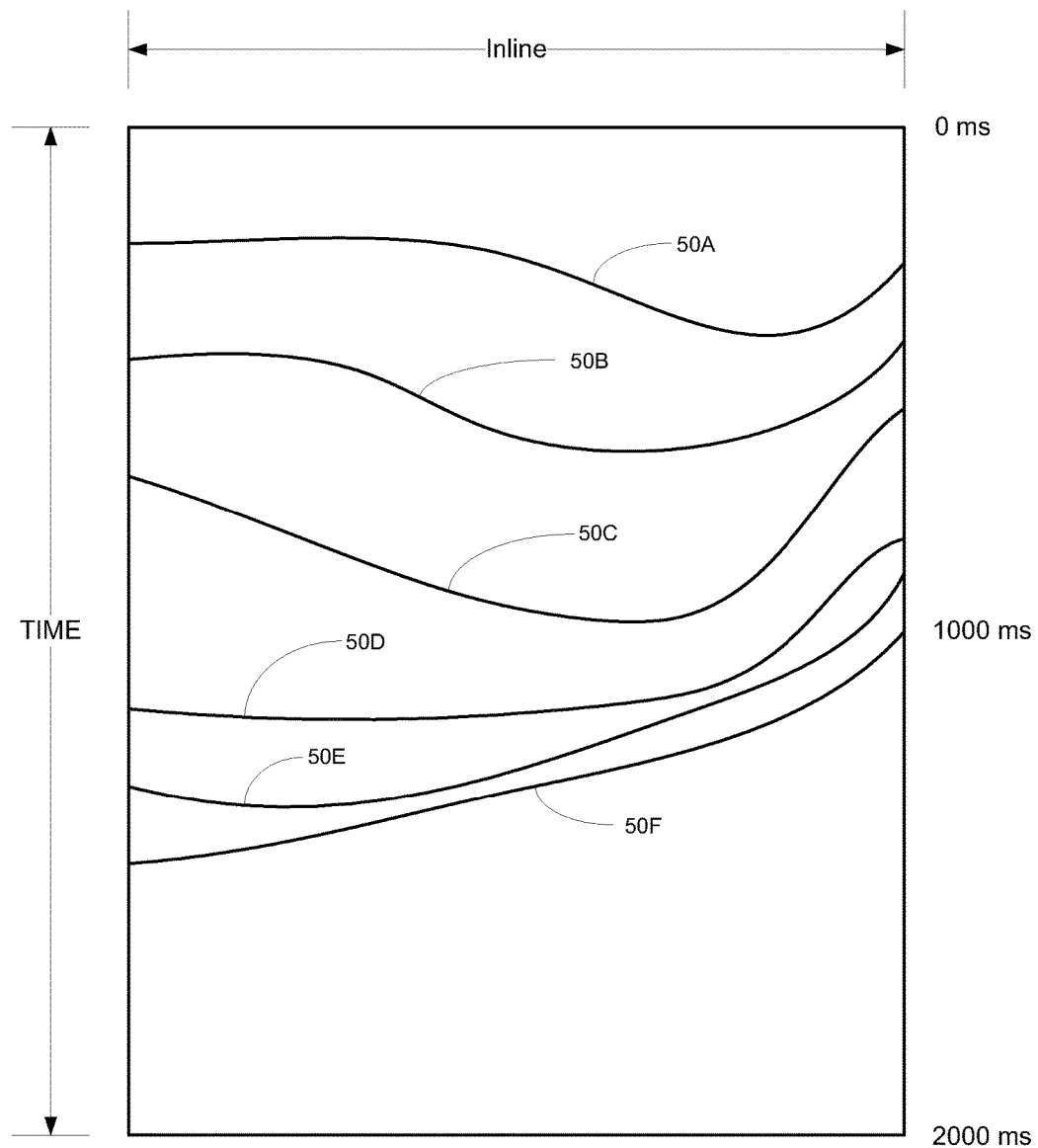
FIG. 5 is a diagram illustrating an example of an inline trace.

For context, FIG. 5 provides a simple example of the inline slice 7, extracted as discussed with reference to FIGS. 4A-4D, that might be displayed on the graphical user interface. In the example, six different reflections 50A-50F are shown at various depths (time samples along the x-axis). The traces gathered for the time slice are used to construct the depicted slice. Each reflection represents an underground feature. Here, for example, the reflection lines may depict boundaries between different underground layers and formations, such as between impermeable rock, water, oil, gas, sedimentary layers, shale, sandstone, and any other numerous possible different layers.

Figure 6:
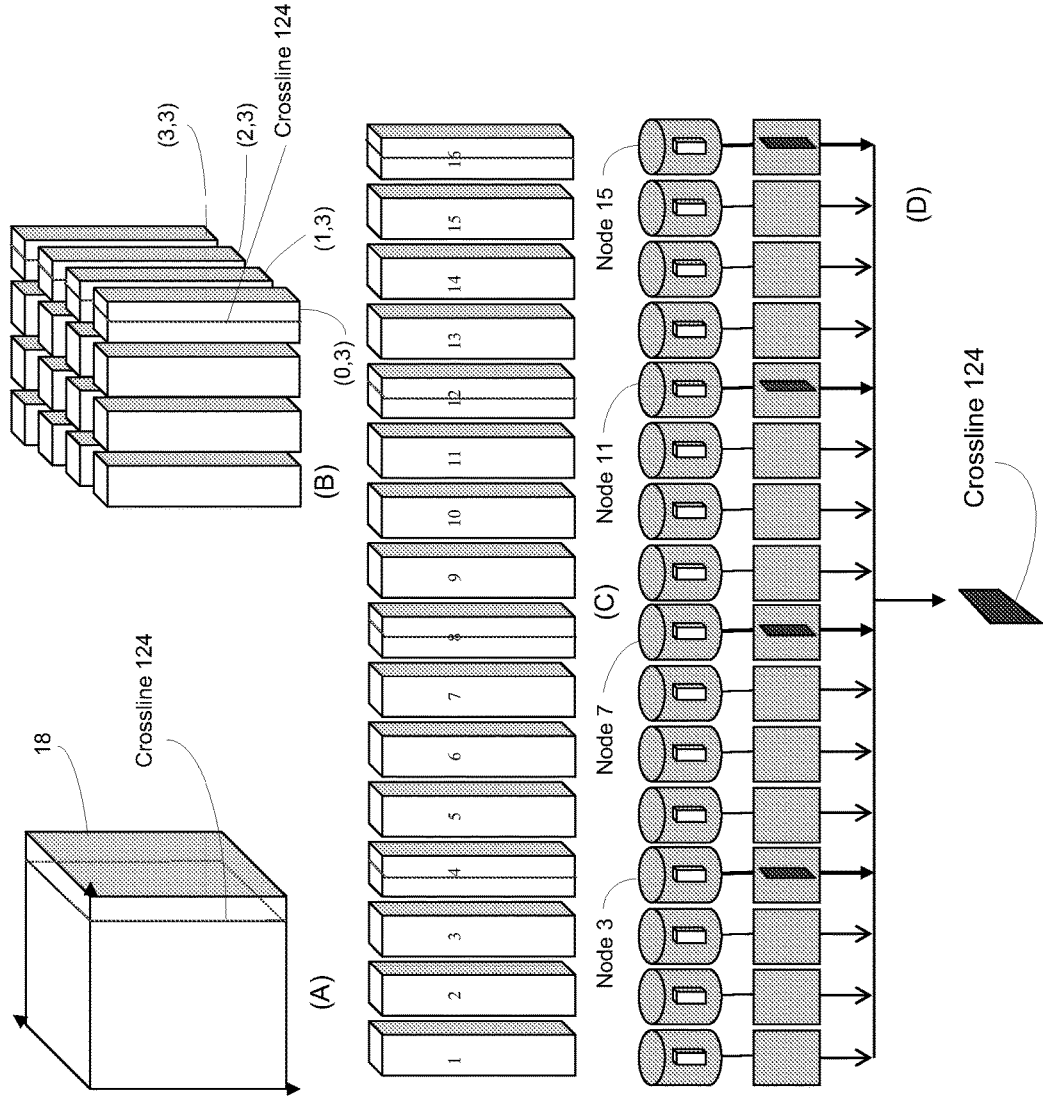
FIG. 6 is a logical flow of requesting a crossline trace from the distributed nodes holding the partitioned data.

FIGS. 6A-6D illustrate reading a crossline slice from the partitioned stack data. FIGS. 7A-7D illustrate reading a time slice from the partitioned stack data. Beginning first with FIGS. 6A-6D, since the stack 18 has been partitioned and distributed across several storage nodes, the system identifies the columns having portions of the crossline slice, and then extracts the relevant traces from the appropriate subset of all nodes holding the entirety of the stack partitions. FIG. 6(A) illustrates a selection of an inline slice to be taken along crossline 124. So, at a remote GUI, a user has issued a command to view the trace data along crossline 124. FIG. 6B illustrates the particular columns (0,3), (1,3), (2,3) and (3,3) that would include the trace data for crossline 124. The two dimensional representation of the columns may be represented in one dimension where column (0,0) is translated to column 1, column (0,1) is translated to column 2, and so forth as shown in FIG. 6C. To extract the trace data, separate threads are dispatched in storage nodes 3, 7, 11, and 15 to read and decrypt the appropriate crossline trace data. From these nodes, the inter-partition index keys are used to pull only the trace data for crossline 124 of the original stack.

With inline and crossline slices, as well as various other possible slices, the system takes advantage of both distributed storage and the various threads (and/or processors) that are dispatched to service the data requests. So, in the above two examples, four threads were dispatched to access four (4) of the sixteen (16) total partitions to extract only the relevant data, in parallel.

Figure 7:
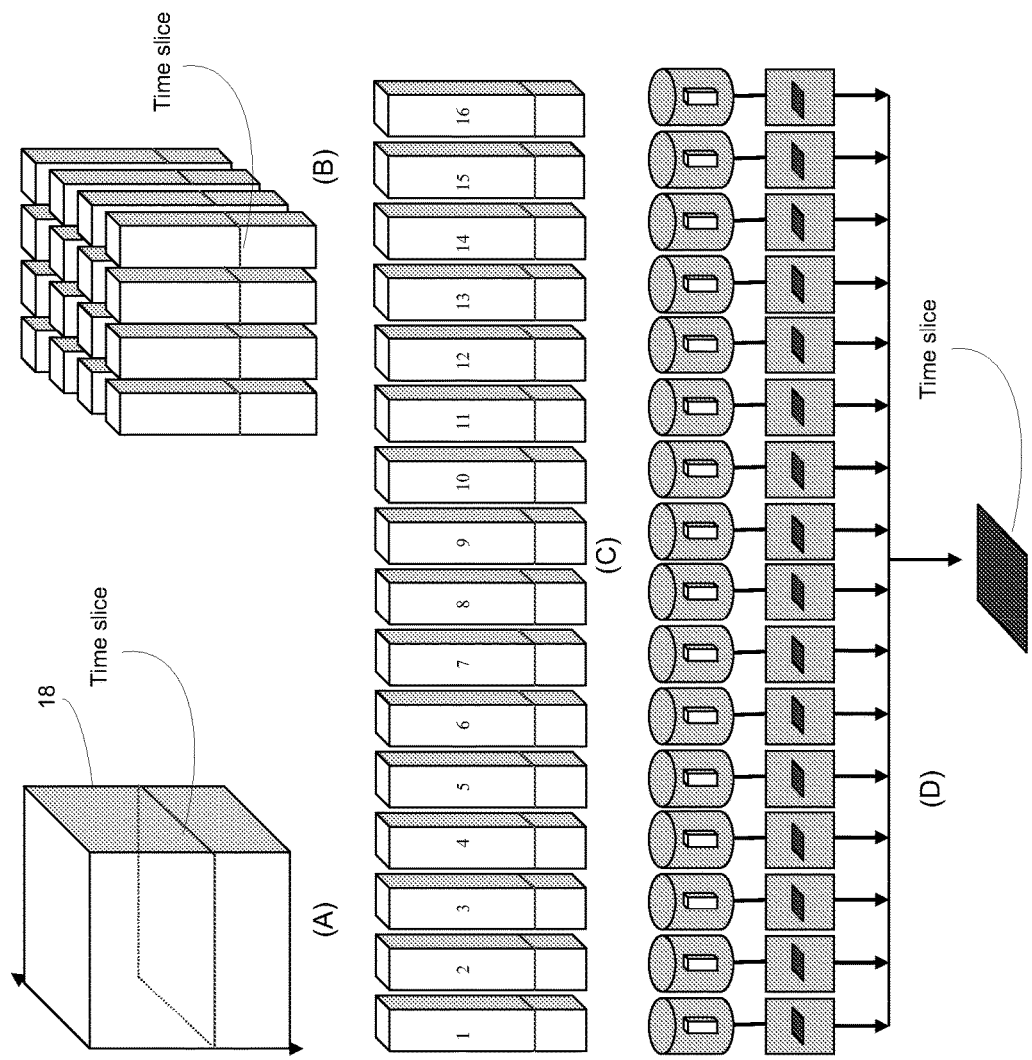
FIG. 7 is a logical flow of requesting a time slice from the distributed nodes holding the partitioned data.

For time slices (or those occurring along the z-axis), more of the partitions are accessed to extract the relevant data; however, the system can still take advantage of parallelism. FIGS. 7A-7D illustrate one example of reading a time slice at some depth in the stack. Here, the time slice has data values found in each of the 16 columns (FIGS. 7B and 7C); thus, threads are dispatched at each storage node to extract the appropriate time slice data and return it to the user interface and the software provided therewith to view the time slice (FIG. 7D).

Figure 8B:
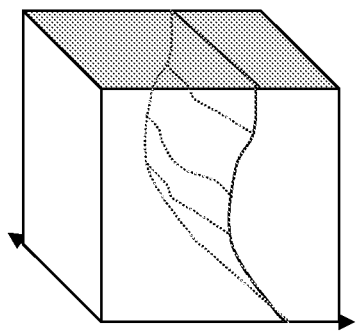
FIGS. 8A and 8B are diagrams depicting an arbitrary cross section and a generalized, complex, surface that may be extracted from the distributed nodes holding the partitioned data.
Figure 8A:
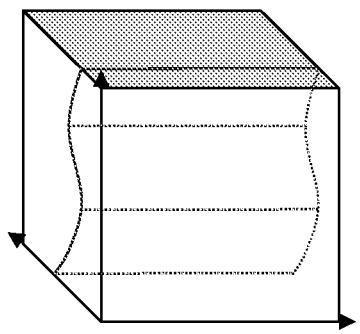

It is also possible to partition the stack along the time axis, as well as the inline and crossline axes as discussed relative to FIGS. 1-6. In one specific example pertaining again to stack data, as opposed to other forms of 3-D data, the data is partitioned into 64 (x or inline)×64 (y or crossline)×16 (z or time) tiles. Thus, for a 128×128×32 stack, there will be eight (8) tiles (one layer of 4 tiles stacked on a second layer of 4 tiles). The same modulo scheme may be deployed with the addition of a third modulo step for the z axis. The z-direction, just as in the x and y directions, is represented as an index that goes from 0 to N, where N is the number of time samples. In one specific example, the partition index in the z direction is given as the integer division result of N/16 and the intra-partition index as the result of the modulo operation N % 16. Such a scheme is particularly helpful for retrieving time slices. Partitioned in this manner, it is possible to create further efficiencies for extracting time slices or other more complex shapes that traverse various possible combinations of axes, such as shown in FIGS. 8A and 8B.

Figure 9:
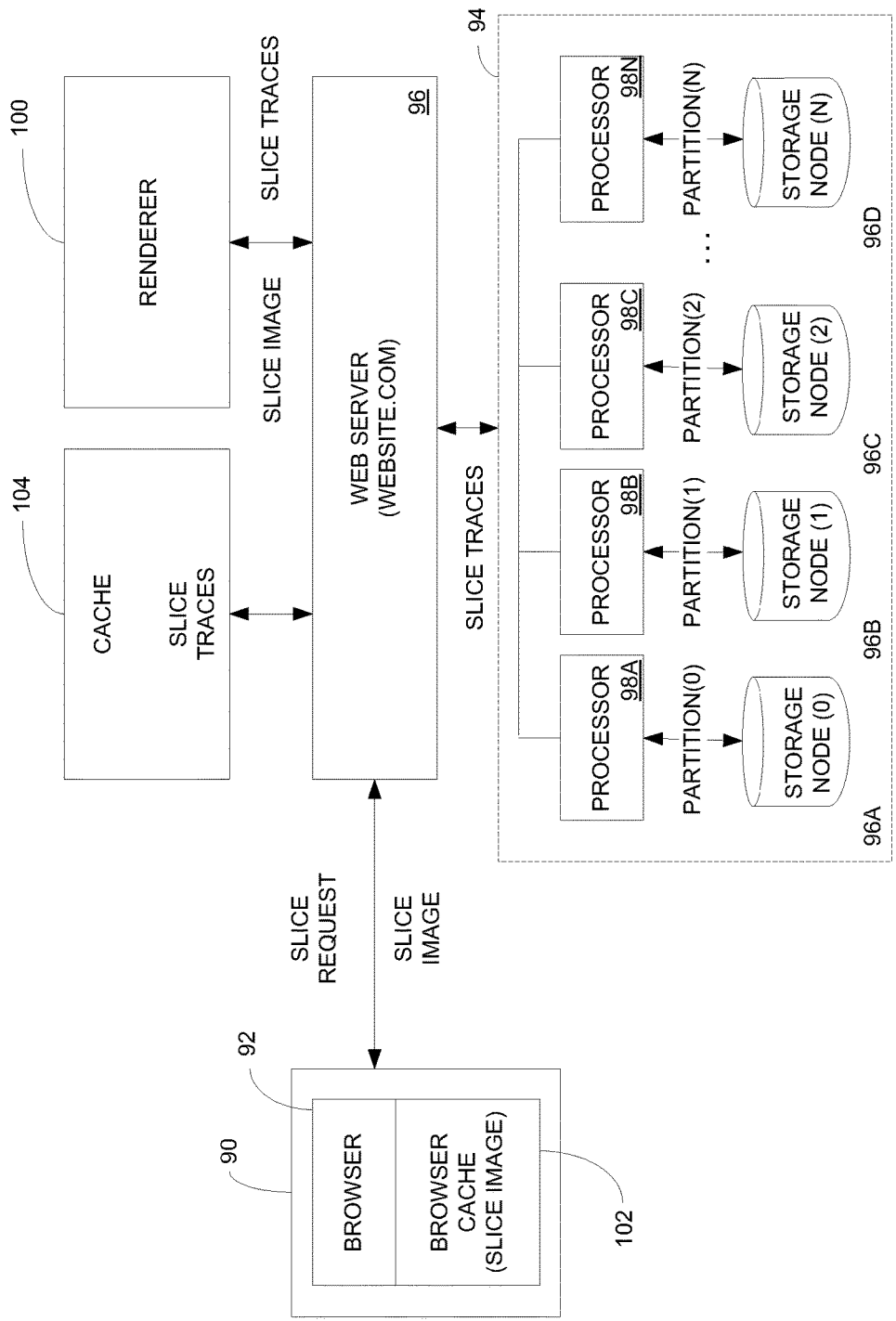
FIG. 9 is a system diagram depicting a cloud storage architecture and flow for retrieving 3-D data partitioned in distributed cloud storage.

FIG. 9 illustrates a system architecture for retrieving information from the distributed storage and rendering the information at a user device 90, such as personal computer, laptop, tablet or the like, operating a browser 92 to access a network, such as the Internet. At a general level, a user at the user device takes an action that causes the browser to request some portion of the partitioned 3-D data from cloud storage 94. In the example of seismic data, the user would be operating an application that allows for viewing, annotating, and otherwise manipulating seismic data, and that application, through or in conjunction with the browser issues a request for a particular slice of the data for viewing, etc. For example and with reference to the example set out above and shown in FIGS. 4-5, the user may request inline slice 7.

The initial request is received at a web server 96 that communicates with the cloud storage 94 as discussed with reference to FIG. 1, the cloud storage may include one or more storage servers 30 that manage requests to the cloud and the return of data from the cloud, and may include a plurality of storage nodes 96 with processors and/or processing threads 98 for reading data from the nodes and writing data to the nodes. The web server provides the appropriate information and request to the cloud storage to extract the appropriate traces from the appropriate nodes. As discussed above and in one specific implementation, the storage keys are generated based on the slice request and the indexes.

More specifically, the data portion of the url (e.g., website.com?name=basic&aspect=inline&number=7) is broken down into its components: name=basic, aspect=inline, and number=7. "Basic" is the name of the 3D dataset, and it is used to lookup in a relational table in the system with the exact address in distributed storage where the seismic traces are stored. Keep in mind that the logical entity that is "basic" is a single thing, even though it is partitioned across nodes of the distributed storage system. Next, per the discussion above, the aspect and number are used to produce a key to the correct partition, and a key to the needed items from within the partition.

The cloud storage then returns the appropriate traces to the web server 96. In this example, the storage would return 128 traces corresponding to each of the traces that fall along inline 7. The traces are provided to a rendering application 100, which may or may not be integrated with the web server, and the renderer returns a 2-dimensional digital image of inline 7, as shown in FIG. 5 as an example. The image may be in the form of .jpeg file, a .png file, or other suitable image file format. The image file is then returned to the browser 92, cached 102 at the browser and displayed at the user device. The image data is cached at the browser but the raw trace data is cached remotely at a second cache 104 in connection with the web server. This distinction provides an important advantage to the present system by allowing both the image as well as the data to recreate the image to be quickly available to the browser. This advantage is illustrated with the following example.

Seismic data may be presented in different visual forms. At a simple level, it is possible to request and view grayscale (black and white) or color seismic data. If the user's initial request was for grayscale data, then a grayscale inline slice would be displayed and cached at the browser. During the course of analyzing the seismic data, the user will typically request other slices, often viewing slices deeper and deeper into the data such as from inline 7, to 8, to 9, and so on. Often, however, the user will return to and request inline 7 again.

Figure 10:
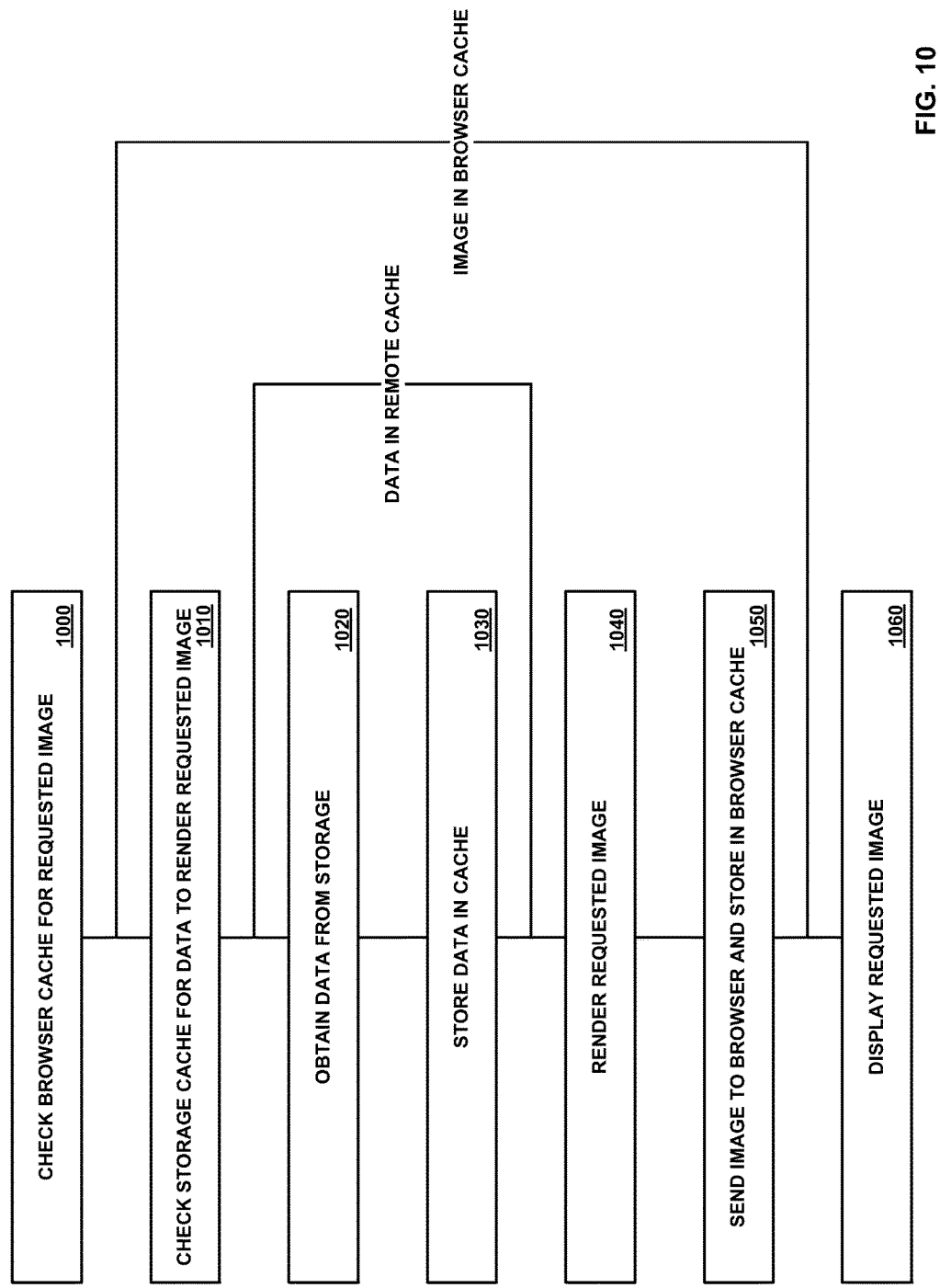
FIG. 10 is a flow diagram of a method of retrieving 3-D data in accordance with aspects of the present disclosure.

FIG. 10 is a flow chart illustrating various operations of a method for retrieving information, in accordance with various aspects of the present disclosure. When retrieving information for display to the user, the system first checks the browser cache or other local cache to determine if a requested image is cached (operation 1000). Referring again to the example introduced above concerning inline 7, If the user requests a grayscale image of inline 7, then the system will first look in the browser cache 102. If inline 7 remains in the cache, then it will be very quickly displayed (operation 1060)—much faster than if the browser has to issue a request to the cloud storage. Should the user request data that had been previously requested but with different rendering parameters, the system checks the storage cache for the trace data that can be used to generate the requested image with appropriate rendering (operation 1010). For example, if the user requests inline 7 but with a different rendering, say color rather than grayscale, then the system first determines if the inline 7 traces are cached remotely at cache 104. If the traces remain in the second remote cache 104, then the traces may be extracted from cached and passed to the renderer 100 (operation 1040) to render a color image and return the color image to the browser 92 where it is cached at the browser cache (operation 1050) and displayed (operation 1060). Rendering the proper image based on traces from the cache is more efficient and faster than having to read the traces from the distributed nodes 96. Finally, if the traces are no longer cached, then the request is processed by extracting the proper traces from the storage nodes (operation 1020). Obtain trace data from the partitioned data stored in the nodes, causes the system to then render the image (operation 1040), store the traces in the remote cache (operation 1030), return the rendered image to the browser (operation 106) where it is stored locally (operation 1050). The browser cache 102 and the remote cache 104 are limited in size, so even if the image or trace data was at one time in cache, it will not remain in cache forever. Cache management can be performed in numerous ways including first-in-first out (FIFO schemes), most recently used (MRU) or least recently used (LRU) schemes, simple time outs, etc. In one example, images and traces are stored in cache for a selectable time period.

To provide the system with the capability to issue one request and select the appropriate data to service the request, a unique query string is used. The query string is as follows:

request(query string)=network location: retrieval information: rendering parameters.

The network location describes the location on a network for the location of the data. The network location may take the form of a uniform resource locator (URL), a uniform resource identifier (URI) or other addressing scheme. The retrieval information may include the name of the cube, the aspect of the section of data being requested, and the section or slice number, if available. The name of the data cube is used to identify the data cube including the requested information, and distinguished it from other cubes that may be accessible from the system. The aspect, in the example of a seismic slice, may include inline, crossline, time, and other aspects such as those depicted in FIGS. 8A and 8B. The number refers to a specific slice. So, referring to the various examples above, the data processing field may be related to inline 7, crossline 124, a time slice, etc.

The rendering information may include a number of different possible fields. Examples of rendering information includes palette (e.g., simple, grayscale, color), gain (a multiplier to apply to the data before rendering) and scale (number of image pixels per data sample). Generally, the rendering parameter describes how the data should be rendered, e.g., grayscale, color, without or without gain, with or without scaling, etc.

Assuming for the sake of an example, that the stack 18 is named "basic," and referring specifically to a grayscale request for inline 7 with the webserver located at www.website.com, the request is as follows:

website.com?name=basic&aspect=inline&number=7&palette=grayscale&scale=1.

Similarly, a color request for inline 7 is as follows:

website.com?name=basic&aspect=inline&number=7&palette=color&scale=1.

In this example, the retrieval parameters are: name=basic&aspect=inline&number=7. The rendering parameters are: palette=grayscale&scale=1.

In a high performance, cloud-based system with many simultaneous users, caching is used to enhance system performance. In the system describe herein, a two-layer cache is described—the first cache is the cloud cache, which stores the data samples (e.g., traces) for each request, for a period of time, under the key composed of the concatenated retrieval parameters. The cloud cache is implemented as close as possible to the processing resources of the cloud-based system. In some cloud-based system, the cloud cache may be referred to as an "in-memory application" cache.

In the example set out above, the key to the cloud cache would be: website.com?name=basic&aspect=inline&number=7 The browser cache may be referred to as a rendering cache, which stores in memory the image for each request, for a period of time, under the key composed of the concatenated base and retrieval and rendering parameters (full URL) (e.g., website.com?name=basic&aspect=inline&number=7&palette=grayscale&scale=1). The rendering cache may be implemented as close as possible to the user of the cloud-based system. In some specific examples, the rendering cache may be a "browser cache". Alternatively, a content delivery network (CDN) can be used for the rendering cache.

Referring again to FIG. 10 and referencing the specific example discussed above, first, the browser cache is checked for the image of inline 7 (operation 1000). The key the browser uses is the full URL (e.g, website.com?name=basic&aspect=inline&number=7&palette=grayscale&scale=1). The web browser will automatically cache web resources (in this specific example, the .png image file) that it retrieves from the web server 96 in the browser cache 102, if a caching parameter in the HTTP header in set that is returned to the browser as part of the response to the request. The cached image file and the browser cache key is always the full URL. That parameter can also indicate the amount of time that the browser should attempt to keep that resource in its cache. So indeed, we are setting that particular HTTP header caching parameter as our means to implement the browser portion of our caching scheme. If the browser determines that it has the resource in its cache, it will not send the request to the webserver.

If the resource is not in its browser cache, the browser forwards the request for the png file (in this example) to the web server 96 (operation 1010). The server then subtracts out the image rendering parameters (palette=grayscale&scale=1) from the URL, and uses the remaining data parameters (website.com?name=basic&aspect=inline&number=7) as the key for searching the cloud data cache for the seismic trace data that might be in the remote cache 104. The rendering parameters are not relevant at this point. If the trace data for inline 7 is in cache, it reads it out and sends it to the renderer 100, which uses the rendering parameters to direct the creation of the png file from the seismic traces (operations 1010 and 104). Of course, if the seismic traces are not in the cloud cache 104, it goes ahead and uses the data parameters to read the seismic trace data from storage 94 (operation 1020).

The various inventive concepts described above may be implemented on virtually any type of computer regardless of the platform being used. For example, as shown in FIG. 11, a computer system 500 includes a processor 502, associated memory 504, a storage device 506, and numerous other elements and functionalities typical of today's computers (not shown). The computer 500 may also include input means, such as a keyboard and a mouse and output means, such as a monitor 512. The computer system 500 may be connected to a local area network (LAN) or a Wide area network (e.g., the Internet), such as communication network 514, via a network interface connection (not shown). Those skilled in the art will appreciate that these input and output means may take other forms. For purposes of the present device, the computer may be used for the web server 26, the storage server 12, or the computing device 22 whereby a user uploads data to the storage cloud or requests data from the cloud by way of the user interface 24.

Further, those skilled in the art will appreciate that one or more elements of the computer system 500 may be located at a remote location and connected to the other elements over a network. The invention may be implemented on a distributed system having a plurality of nodes, where each portion of the invention (e.g., the operating system, file system, cache, application(s), etc.) may be located on a different node within the distributed system, and each node may correspond to a computer system. Alternatively, the node may correspond to a processor with associated physical memory. The node may alternatively correspond to a processor with shared memory and/or resources. Further, software instructions to perform embodiments of the invention may be stored on a tangible computer readable medium such as a compact disc (CD), a diskette, a tape, a digital versatile disk (DVD), or any other suitable tangible computer readable storage device.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., floppy diskette), optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

The invention claimed is:

1. A method of obtaining image data from cloud storage comprising:
 generating a request for an image at a client device, wherein:
  the image is a graphical rendering of image data rendered according to a rendering parameter,
  the image data is a subset of an image data set having a multi-dimensionally organized form, the image data set partitioned across a plurality of remote storage nodes of a cloud storage,
  the request includes each of an identifier associated with a location in the image data set and the rendering parameter,
  the request is used to determine whether a cached image is available in a local cache of the client device, the cached image including the requested image; and
  when the cached image is not available in the local cache, the request is further used to determine whether the image data is cached in a remote cache, the remote cache configured to store the image data for rendering the image according to the rendering parameter when the cached image is not available in the local cache; and when the image data is not available in the remote cache, caching the image data for rendering the image in the remote cache, the image data retrieved from the plurality of remote storage nodes.

2. The method of claim 1 wherein the request further comprises a uniform resource locator comprising a network location for a server configured to access the remote cache and the plurality of remote storage nodes of the cloud storage and a retrieval parameter.

3. The method of claim 2 wherein:
the image data set comprises a plurality of seismic trace data values,
the network location is a network address for the server,
the server manages a retrieval of the seismic trace data values from the plurality of remote storage nodes,
the retrieval parameter includes at least one trace identifier, and
the rendering parameter includes data processing information applied by a rendering application run against the image data.

4. The method of claim 2 wherein:
the network location comprises a network address of the server,
the server manages retrieval and rendering of images from image data of the image data set, and
the retrieval parameter includes at least one of an inline value, a cross line value, and a time value.

5. The method of claim 1 wherein:
the local cache is a browser cache,
the request includes a full uniform resource locator comprising a network location, a retrieval parameter, and the rendering parameter, the full uniform resource locator for accessing the cached image in the browser cache;
the network location and the retrieval parameter are used to access the image data cached in the remote cache,
the rendering parameter is used by a rendering application to generate the image; and
the retrieval parameter is used to generate a plurality of partition keys to retrieve the image data from the plurality of remote storage nodes.

6. The method of claim 1 wherein each of the plurality of remote storage nodes is a virtual storage node.

7. The method of claim 1 wherein the image data set comprises three-dimensional data and the image data for rendering the image is a two-dimensional portion of the three-dimensional data.

8. The method of claim 7 wherein the request further comprises a retrieval parameter, the retrieval parameter including an aspect parameter and a number parameter for generating keys to retrieve the image data from the plurality of remote storage nodes for rendering the two-dimensional portion of the three-dimensional data.

9. A method of obtaining data from cloud storage comprising:
receiving a request for an image, wherein:
the image is a graphical rendering of image data rendered according to a rendering parameter,
the image data is a subset of an image data set having a multi-dimensionally organized form and partitioned across at least a first node and a second node of a remote distributed storage system, and
the request includes an identifier associated with the requested image and the rendering parameter;

when the image data corresponding to the requested image is not cached in a remote cache, generating a first key for retrieving a first portion of the image data from the first node and a second key for retrieving a second portion of the image data from the second node; and
providing the first portion of the image data, the second portion of the image data, and the rendering parameter to a browser for rendering of the requested image according to the rendering parameter.

10. The method of claim 9 wherein the request includes a network address for a server in operable communication with the remote distributed storage system.

11. The method of claim 9 further comprising caching the first portion of the image data and the second portion of the image data in the remote cache and caching the requested image at a rendering cache.

12. The method of claim 11 wherein the rendering cache is a browser cache.

13. The method of claim 9 wherein the image data set comprises three-dimensional data and the request further comprising an aspect parameter, the method further comprising:
generating the first key and the second key based on the aspect parameter;
providing the image data, the aspect parameter, and the rendering parameter to the browser, the image data being a two-dimensional portion of the three-dimensional data;
rendering the image data at the browser based on the aspect parameter and the rendering parameter to generate the requested image; and
caching the requested image in a browser cache of the browser.

14. The method of claim 10 wherein the request further includes a network parameter, an aspect parameter and a number parameter, the method further comprising, when the image is not in a rendering cache, at the server:
when the first portion of the image data and the second portion of the image data are cached at a remote cache, retrieving the first portion of the image data and the second portion of the image data from the remote cache;
when the first portion of the image data and the second portion of the image data are not cached at the remote cache, retrieving the first portion of the image data and the second portion of the image data from the remote distributed storage system; and
transmitting the first portion of the image data and the second portion of the image data to a renderer to generate the requested image according to the rendering parameter.

15. The method of claim 14, further comprising caching the first portion of the image data and the second portion of the image data in the remote cache when the first portion of the image data and the second portion of the image data are not cached in the remote cache.

16. The method of claim 15 further comprising generating, when the first portion of the image data and the second portion of the image data are not cached in the remote cache, the first key for retrieving the first portion of the image data from the first node and the second key for retrieving the second portion of the image data from the second node using the aspect parameter and a number parameter of the request.

17. The method of claim 9 wherein the image data set comprises three-dimensional data, the method further comprising:

providing the image data, an aspect parameter, and the rendering parameter to the browser, the image data being a two-dimensional portion of the image data set, and rendering the image data at the browser based on the aspect parameter and the rendering parameter to generate the requested image.

18. The method of claim 17 further comprising caching the two-dimensional portion of the image data set in a rendering cache.

19. An apparatus comprising:
a server in operable communication with a remote distributed storage and a remote cache, the server including a processor operably coupled with a tangible computer memory including computer readable instructions for:
receiving a request for an image, wherein:
the image is a graphical rendering of image data rendered according to a rendering parameter, the image data is a subset of an image data set having a multi-dimensionally organized form and partitioned across at least a first node and a second node of remote distributed storage, the request including an identifier associated with the requested image and the rendering parameter;

when the image data is not cached in the remote cache, generating a first key for retrieving a first portion of the image data from the first node and a second key for retrieving a second portion of the image data from the second node; and providing each of the first portion of the image data and the second portion of the image data to a requesting browser for rendering by the browser according to the rendering parameter to generate the requested image.

* * * * *